Feb. 21, 1950        J. J. SALZMANN        2,497,960
VEHICLE JACK
Filed Oct. 22, 1947
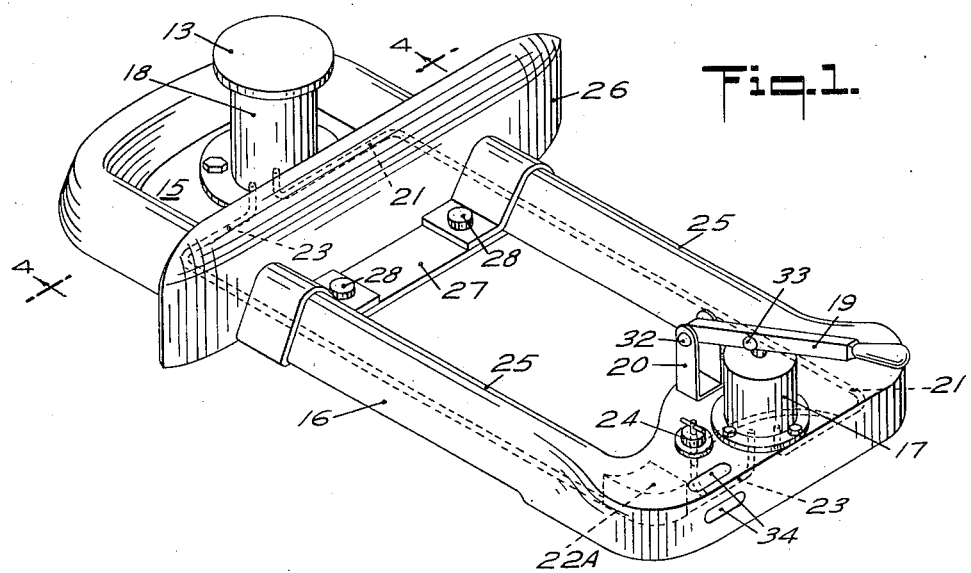
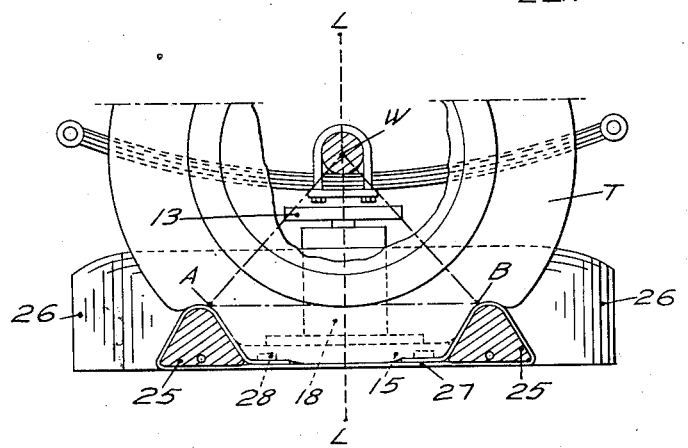
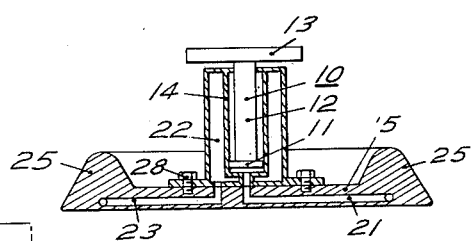
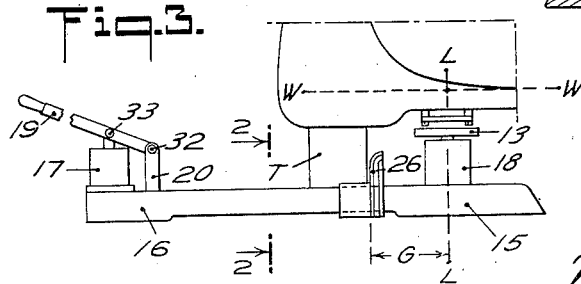
INVENTOR
JOHN J. SALZMANN
BY
Woodcock and Phelan
ATTORNEYS Patented Feb. 21, 1950

2,497,960

UNITED STATES PATENT OFFICE 2,497,960

VEHICLE JACK

John J. Salzmann, Philadelphia, Pa.

Application October 22, 1947, Serial No. 781,395

4 Claims. (Cl. 254—88)

This invention relates to jacks, and particularly to portable jacks such as carried in automobiles for use in changing of the tires or wheels.

In general, there are two types of such jacks currently used: one, the so-called "bumper" jack, is popular because it does not require the operator to position the jack beneath the car and so avoids soiling of his clothes or person. This type of jack, because it lifts one side of the car until a wheel and axle is freely suspended from a car-spring, requires a very substantial vertical travel of its lifting member to raise the tire or wheel clear of the road. In consequence, the jack is unstable and may tilt, allowing the car to fall, with resultant injury to the car or to the operator. The other type of jack is suited to be pushed beneath the car, from the front or rear, to a position beneath a wheel axle and spring. Less movement of its lifting element is required to clear the wheel from the tire or road since the vehicle spring is compressed during the lifting; however, with this type of jack, particularly when used with present types of passenger automobiles characterized by small road clearance and large overhang of the car body at its front and rear, it is difficult properly to position the jack with respect to the understructure of the vehicle without soiling of the clothes.

With the present invention, the lifting element of a jack can be accurately located longitudinally and transversely of the understructure of a vehicle without need to reach under the car and, for reasons which later herein appear, the jack is inherently safe and conveniently actuable. More specifically, the jack is provided with an elongated base upon which a wheel of the vehicle rides firmly to hold it in place during the lifting operation and the base of the jack is provided with rails or equivalent raised elements which engage the periphery of the wheel at spaced points definitely to locate the axis of the lifting element of the jack longitudinally of the car without any special care or effort on the part of the operator. Moreover, the rails, or equivalent, may also serve to support a wheel-guide which definitely fixes the location of the axis of the lifting element of the jack transversely of the vehicle to insure its engagement with a desired part of the understructure of the vehicle.

Further in accordance with the invention, the jack is of the hydraulic type and its pump is disposed on the outer or exposed side of the base for operation of the jack from the side of the car, clear of the path of any possible movement thereof.

The invention further resides in features of construction, combination and arrangement hereinafter described and claimed.

For more detailed understanding of the invention, reference is made to the accompanying drawings in which:

Fig. 1 is a perspective view of the vehicle jack device;

Fig. 2 is a sectional view taken on line 2—2 of Fig. 1 and in addition shows the relation between elements of the jack and parts of a vehicle;

Fig. 3 is a side elevational view of the jack device and shows the relation of parts thereof with respect to a vehicle; and Fig. 4 is a sectional view taken on the line 4—4 of Fig. 1.

Referring to the drawings as exemplary of a preferred form of jack embodying the invention, the lifting member 10 comprises a piston or plunger 11 whose stem or rod 12 connects the piston to a platform 13 suited to engage the understructure of an automobile or other vehicle. By way of example, the length or diameter of platform 13 may be about five inches. The piston 11 is vertically reciprocable in the cylinder 14 which is supported at its lower closed end upon a base member 15 provided with an extension 16 onto which a wheel of the vehicle may ride, thus to hold the base firmly against the ground during the raising of the car.

The pump 17 is mounted at or near the end of the base extension 16 remote from the hydraulic lifting device 18 comprising the aforesaid cylinder 14, piston 11 and associated parts. The manually-operable handle 19 for operating the pump 17 may be pivotally supported by bracket 20 mounted upon the base extension 16 near the pump 17. The fluid connection from the discharge side of pump 17 to the cylinder 14 may be provided by a pipe or preferably by a passage 21 within the solid framework of the jack base and its extension. The reservoir for storage of liquid forced by the pump into cylinder 14 may be provided in whole or in part by the cylinder 22 concentric with the cylinder 14, or it may, in whole or in part, be provided by a cavity 22A in the base member 15 or its extension 16. In any event, the liquid reservoir is connected to the intake side of the pump 17 either by a passage 23 in the jack-base or frame or by a suitable pipe line. The by-pass valve 24 is closed preliminary to operation of the pump handle 19 for raising of the platform 13 and is opened for release of the jack, the fluid then flowing back to reservoir because of pressure exerted by the weight of the vehicle upon platform 13.

The extension 16 of the base 15 is provided with or formed by two raised elements or rails 25, 25 fixed with respect to the axis L—L of the lifting element of the jack. The distance between the rails is substantially less than the diameter of the vehicle wheel T so that, as shown in Fig. 2, they may concurrently be in engagement, as at points A and B, with the periphery of a wheel T resting upon the base extension of the jack. The rails 25, 25 thus serve definitely to align the axis L—L of the lifting member 10 longitudinally of the vehicle, with respect to the axle, or axis of rotation W of the wheel. Moreover, with the wheel in the depression between the two rails, any accidental longitudinal movement of the car is resisted by the force necessary to raise the wheel over a rail 25.

To put the jack into use, the operator would merely put the base of the jack upon the ground immediately in front or to the rear of the wheel to be changed with the rails 25 substantially parallel to the wheel axle. The vehicle is then driven or moved onto the base extension until the wheel rests upon the two rails 25, 25, Fig. 2, with the axis W of the wheel intersecting the vertical axis L—L of the jack element 11. Without any further effort on the part of the operator, it is thus insured the lifting element 10 of the jack is in proper position longitudinally of the vehicle to engage, when raised, the wheel axle, spring or associated understructure of the vehicle.

To insure that the lifting member 10 is in proper position transversely of the vehicle, there is provided a wheel guide 26 extending transversely of the base to engage one side or the other of a wheel driven onto the base extension. The ends of the guide 26 which may be of sheet metal are preferably curved to cam the walls of a tire as it is being driven upon the extension of the base, thus at least in part to compensate for the effect of different degrees of inflation of the tire upon the transverse position of the jack; assuming the guide is to engage the inboard face of the tire, its ends are curved outwardly toward the rear of the base.

To accommodate the jack for use with different cars, the wheel guide 26 is adjustably secured to the base as by attachment to a saddle or carriage 27 slidable along the rails 25, 25. The wheel guide 26 may thus be moved toward or from the axis of the lifting member 10 and clamped in adjusted position as by the locking nuts 28, 28, or equivalent. If desired, the upper faces of the rails 25, 25 may be provided with graduations or scale markings to facilitate adjustment of the guide 26 to proper position for the different makes of cars or to suit the difference between the front and rear wheel mountings of a particular car.

As shown in Fig. 3, the wheel guide is preset to such distance G from the axis L—L that when the jack assembly is positioned in front or to the rear of a wheel to be changed, the outboard face of the guide 26 engages the inboard face of the tire or wheel. When the guide 26 is thus preset, the operator upon placing the jack in the path of the wheel T with the guide resting against a face thereof is assured that when the wheel is driven onto the base extension 16 the lifting member 10, as shown in Fig. 3, is in proper position transversely of the car with respect to the understructure of the car, the rails 25 insuring longitudinal alignment as above described. Thus both settings are predetermined by the single act of positioning the base in front or in back of the wheel. To facilitate positioning of the jack, a hand-grip afforded by the slots 34, 34 in the base extension may be provided.

The operating handle of the jack, as shown in Fig. 4, is entirely clear of the car and may therefore be operated without obstruction by the car body or any of its appurtenances. Furthermore, as the operator of the pump is to the side of the car, he is clear of its path of movement should it for any reason be dislodged.

The mounting for the pump and handle are beyond the range of adjustment of the wheel guide 26 to avoid interference either to adjustment of the guide to meet different situations or to operation of the pump for any setting of the guide.

To facilitate storage of the jack, the pins 32, 33 for connecting the pump handle 19 to mounting 20 and to the pump piston may be readily removable so that the handle may be detached; alternatively, only pin 33 may be removable, and the handle 19 thrown back about pivot pin 32 when not in use.

Though a preferred embodiment of the invention has been shown and described in detail sufficient to enable one skilled in the art to construct and use it, it is to be understood the invention is not limited thereto and that further variations and modifications which suggest themselves are within the scope of the appended claims.

What is claimed is:

1. A vehicle jack comprising a vertically movable lifting member for engaging the understructure of a vehicle, a base member for supporting said lifting member, said base member comprising a pair of rails spaced to engage the periphery of a vehicle wheel thereon definitely to locate the axis of said lifting member at a desired position longitudinally of the vehicle, and a wheel guide adjustable along said rails definitely to locate the axis of said lifting member at a desired position transversely of the vehicle.

2. A vehicle jack comprising a vertically movable lifting member for engaging the understructure of a vehicle, a base member for supporting said lifting member and having an extension onto which a wheel of the vehicle may ride, a pair of rails projecting upwardly from said extension to engage said wheel and so definitely to locate the axis of said lifting member longitudinally of the vehicle, a wheel guide adjustable along said rails definitely to locate said axis transversely of the vehicle, and a manually operable actuating member for said lifting member mounted upon said extension beyond the range of adjustment of said wheel guide.

3. A vehicle jack comprising a hydraulic device having a vertically movable lifting member for engaging the understructure of a vehicle, a base for supporting said device beneath a vehicle and having an extension onto which a wheel of the vehicle may ride, a manually operable pump mounted on the outboard side of said base, a fluid reservoir in said base, and fluid connections between said device, said pump and said reservoir.

4. A vehicle jack comprising an elongated base, a vehicle lifting member supported near one end of said base, a manually operable element for actuating said lifting member mounted near the opposite end of said base, a wheel guide extending transversely of said base, and a pair of rails extending lengthwise of said base for adjustably supporting said guide and for engaging the periphery of a vehicle wheel definitely to position the axis of said lifting member at a predetermined position longitudinally of the vehicle.

JOHN J. SALZMANN.

REFERENCES CITED

The following references are of record in the file of this patent:

UNITED STATES PATENTS

| Number | Name | Date |
|---|---|---|
| 2,053,646 | Whalen | Sept. 8, 1936 |
| 2,321,602 | Jensen | June 15, 1943 |